UNITED STATES PATENT OFFICE.

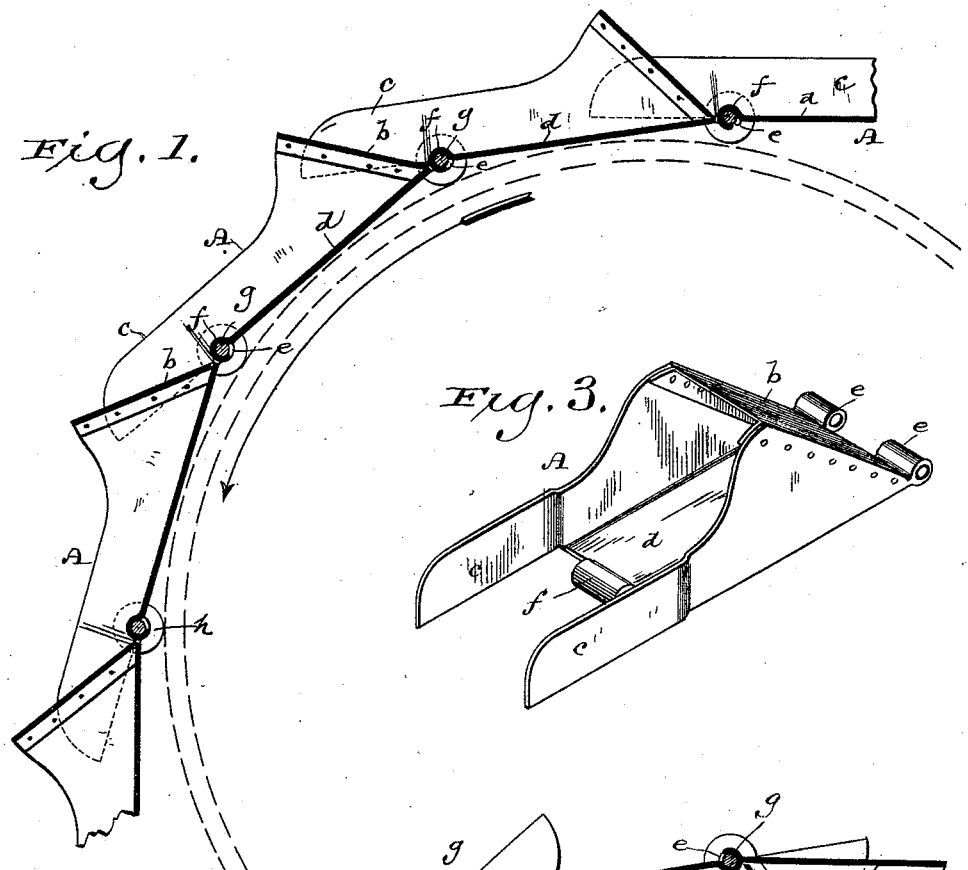

JOHN H. OTTEN, OF MILWAUKEE, WISCONSIN.

ENDLESS CONVEYER.

SPECIFICATION forming part of Letters Patent No. 437,506, dated September 30, 1890.

Application filed July 25, 1890. Serial No. 359,912. (No model.)

*To all whom it may concern:*

Be it known that I, JOHN H. OTTEN, of Milwaukee, in the county of Milwaukee, and in the State of Wisconsin, have invented certain new and useful Improvements in Endless Conveyers; and I do hereby declare that the following is a full, clear, and exact description thereof.

My invention relates to endless conveyers for coal, grain, and other material; and it consists in certain peculiarities of construction and combination of parts, to be hereinafter described with reference to the accompanying drawings and subsequently claimed.

In the drawings, Figure 1 represents a sectional view of an endless conveyer constructed according to my invention; Fig. 2, a similar view showing the conveyer arranged to discharge in a direction opposite to that shown in the preceding figure, and Fig. 3 a perspective view of one of the buckets that constitute said conveyer.

Referring by letter to the drawings, A represents a bucket having an inclined end $b$, and the sides of this bucket have offset extensions $c$ beyond the bottom $d$ thereof. The bottom $d$ of the bucket is provided at its ends with eyes $e f$, and the eye or eyes of one bucket are brought into register with the eyes of opposing buckets, and pintles $g$ passed through said eyes unite the several buckets to form an endless conveyer. The buckets being united, as above described, the offset side extensions $c$ of one bucket come upon the outside of the inclined end of the next adjacent bucket.

The pintles $g$ are preferably provided at their ends with rollers $h$, that travel on the ends of drums, (shown in dotted lines, Figs. 1 and 2;) but if found more desirable, said pintles may be connected to drive-chains run on the drums.

By the construction above described I provide an endless conveyer that may be arranged to discharge either to the outside or inside of the drums. As shown in Fig. 1, the conveyer is discharging outside the drum, and the inclined end of the bucket that has made its discharge forms an extension of the bottom of the succeeding bucket that is at the discharging-point, and the side extensions of the latter bucket prevent the material from scattering. As shown in Fig. 2, the buckets are discharging to the inside of the drum, the inclined end of each bucket serving as a chute when the point of discharge is reached.

Having thus fully described my invention, what I claim as new, and desire to secure by Letters Patent, is—

1. An endless conveyer comprising a series of buckets joined one to the other, each bucket having an inclined end and the sides thereof offset and extended beyond the bottom, substantially as set forth.

2. An endless conveyer comprising a series of buckets, each of which has an inclined end and offset side extensions, eyes at each end of the bucket-bottom and in register with eyes on the buckets next adjacent, and pintles passed through said eyes, substantially as set forth.

In testimony that I claim the foregoing I have hereunto set my hand, at Milwaukee, in the county of Milwaukee and State of Wisconsin, in the presence of two witnesses.

JOHN H. OTTEN.

Witnesses:
 N. E. OLIPHANT,
 WM. KLUG.